Figure 1:
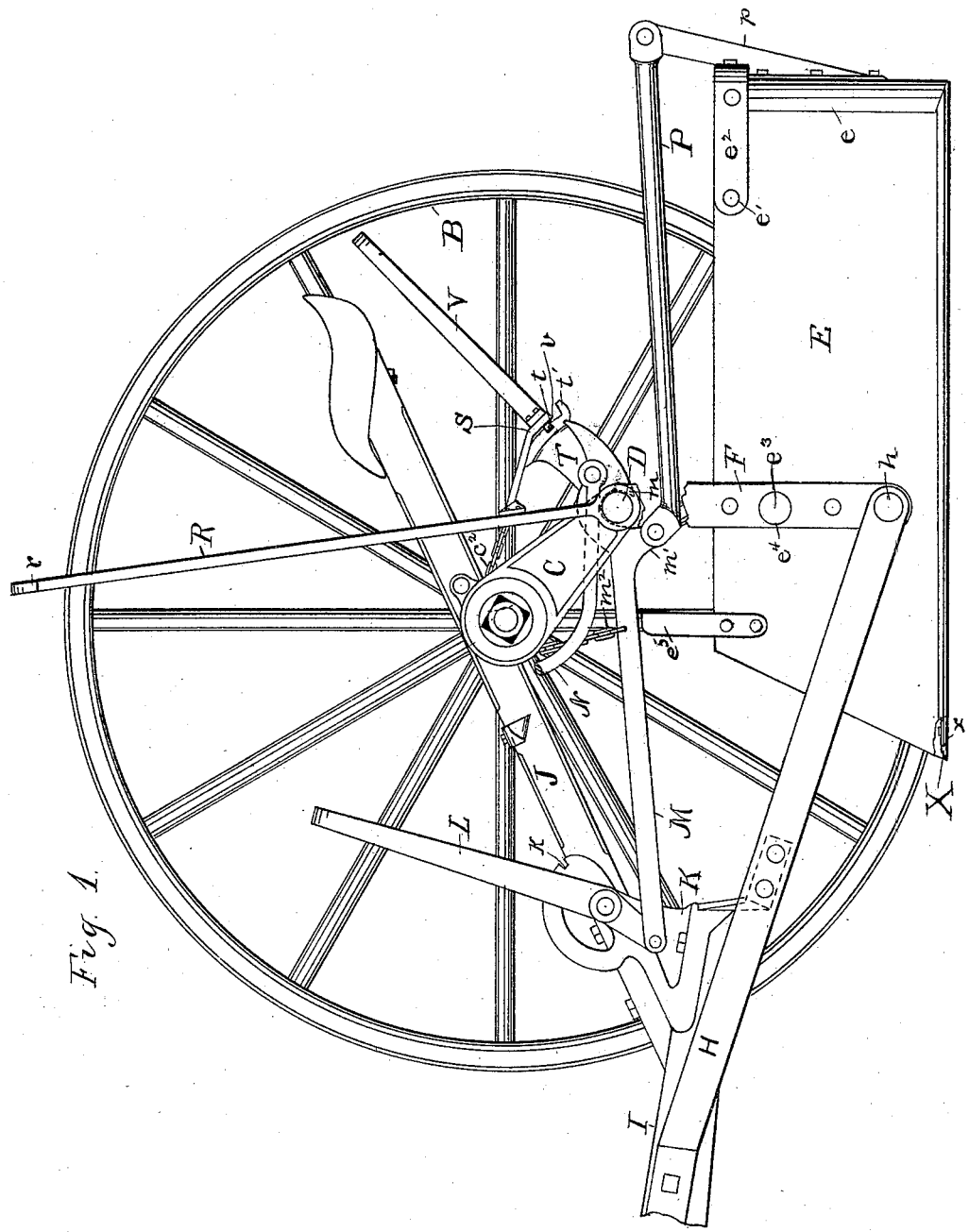

(No Model.) 4 Sheets—Sheet 1.

F. A. RATHBUN.
WHEELED SCRAPER.

No. 371,704. Patented Oct. 18, 1887.

WITNESSES:
E. L. Thurston.
Wm. D. Smith

INVENTOR
Frank A. Rathbun
BY Hill + Dixon
ATTORNEYS

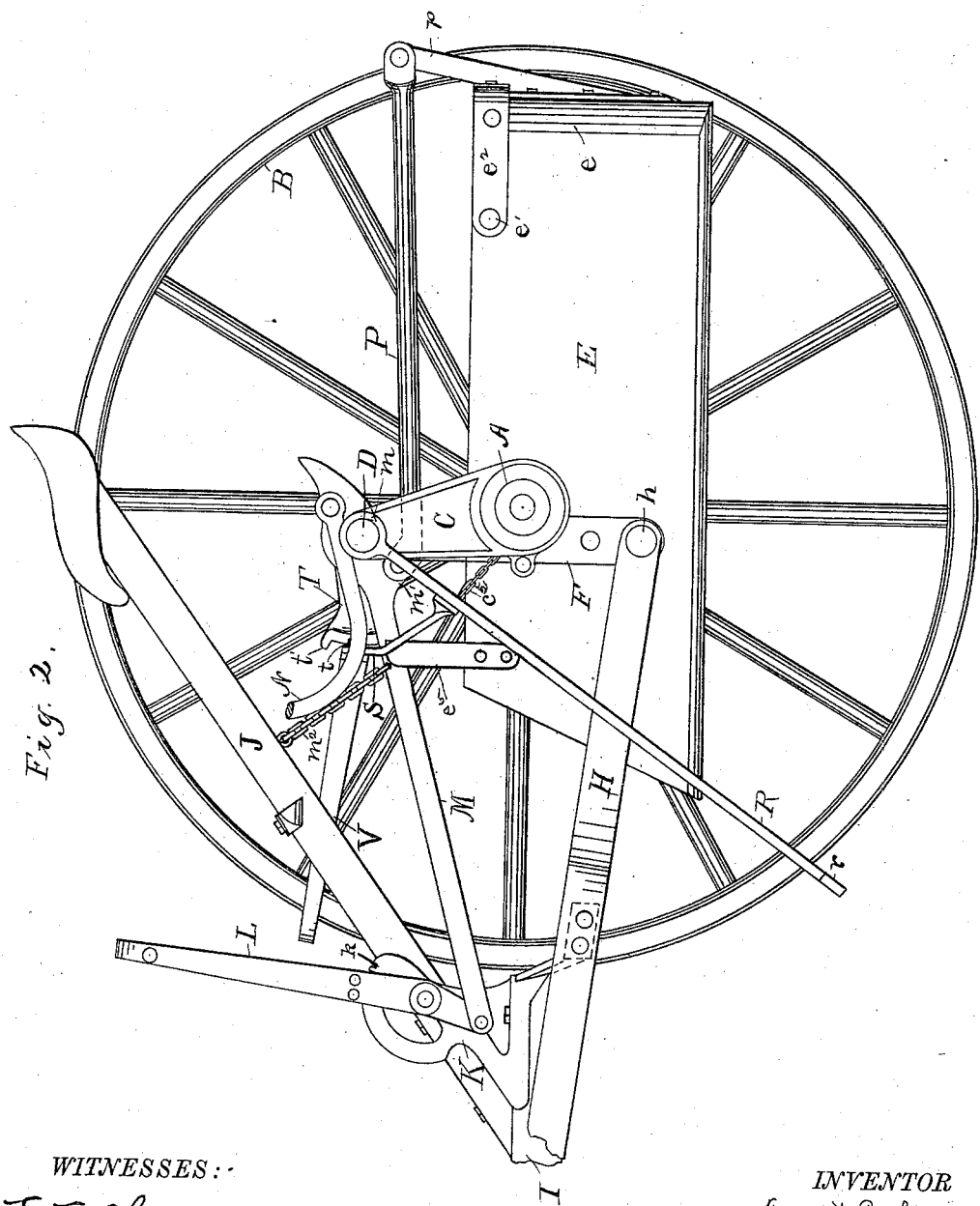

(No Model.) 4 Sheets—Sheet 3.
F. A. RATHBUN.
WHEELED SCRAPER.
No. 371,704. Patented Oct. 18, 1887.
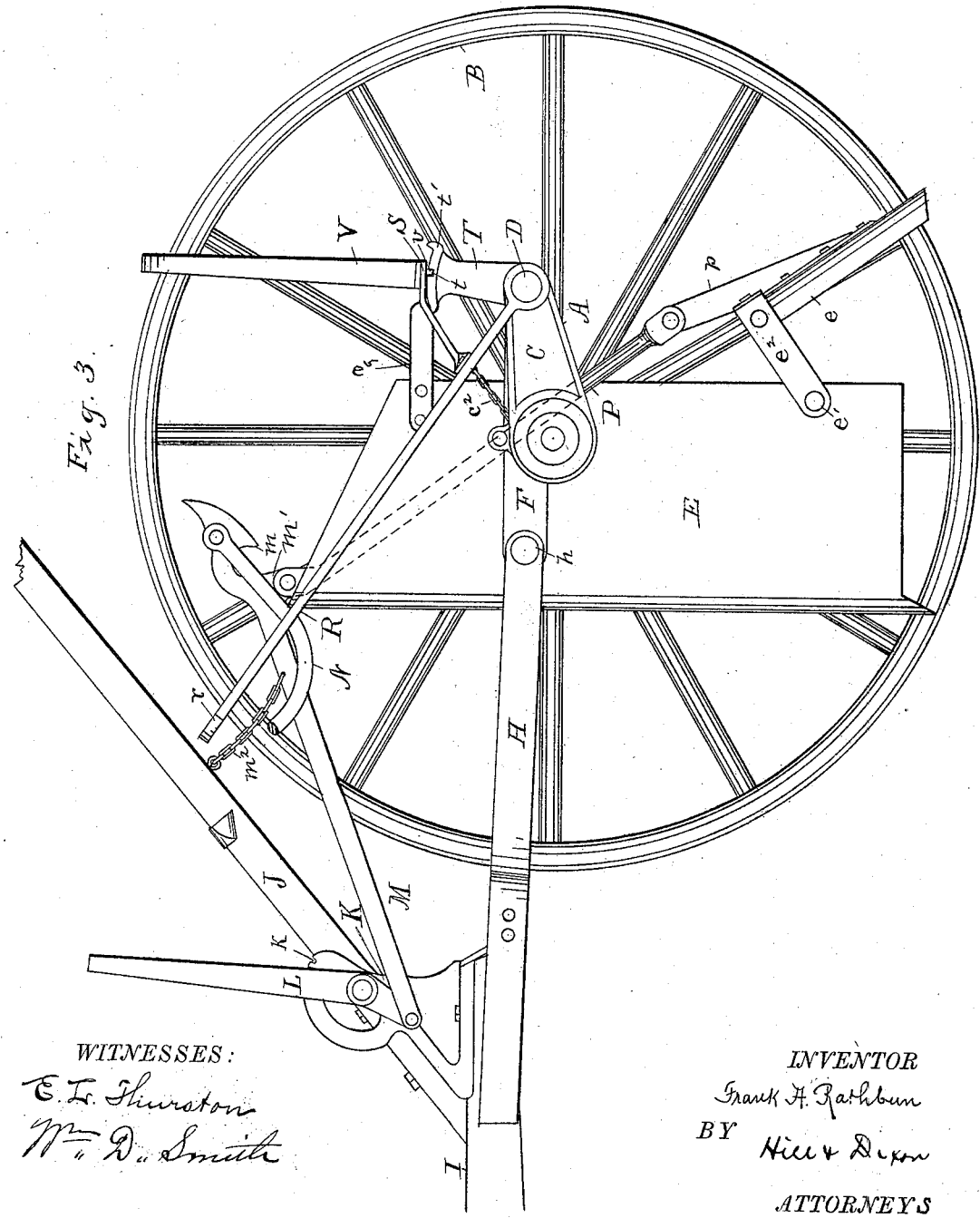
WITNESSES:
E. L. Thurston
W. D. Smith
INVENTOR
Frank A. Rathbun
BY Hill & Dixon
ATTORNEYS (No Model.) 4 Sheets—Sheet 4.
F. A. RATHBUN.
WHEELED SCRAPER.
No. 371,704. Patented Oct. 18, 1887.
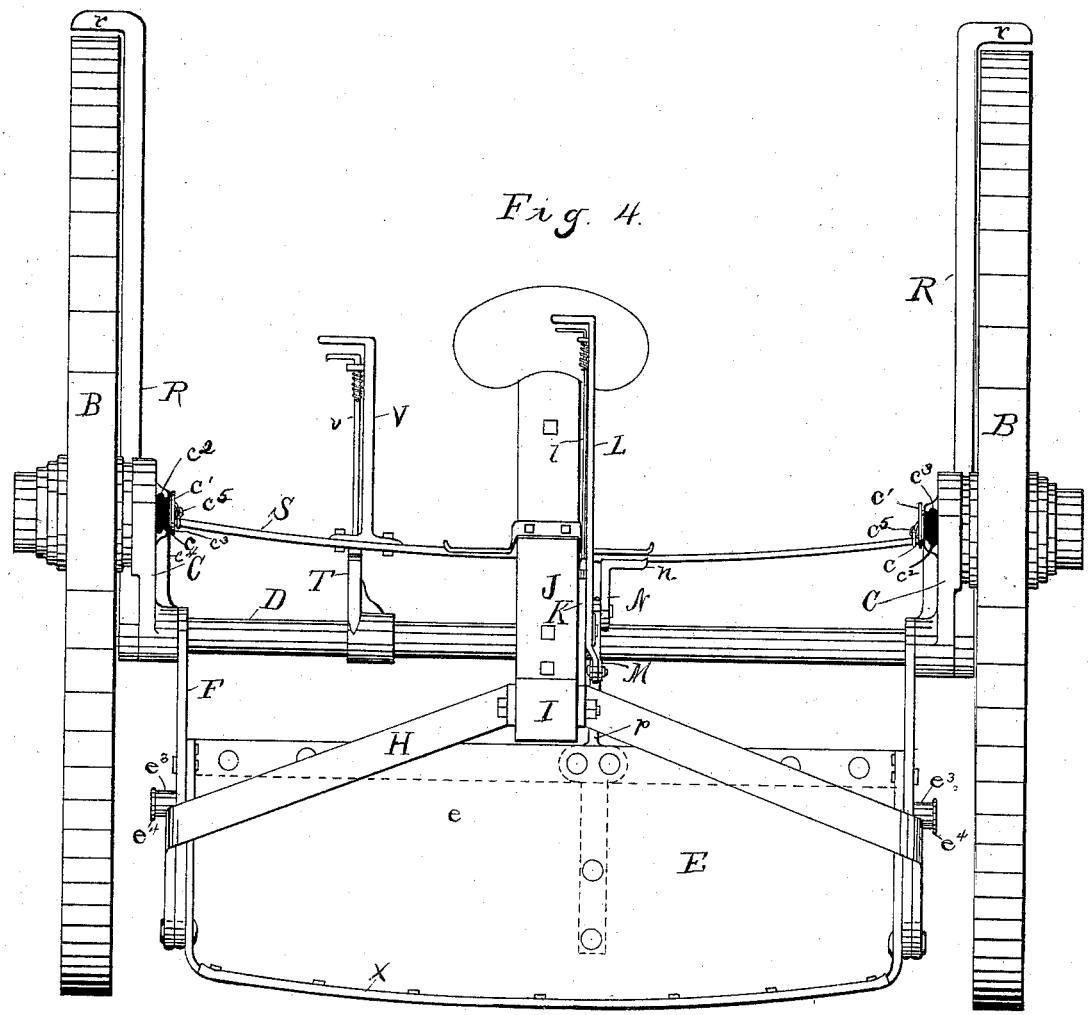
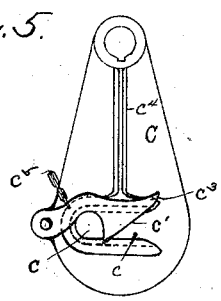
WITNESSES:
E. L. Thurston
Wm. D. Smith
INVENTOR
Frank A. Rathbun
BY Hill & Dixon
ATTORNEYS

UNITED STATES PATENT OFFICE.

FRANK A. RATHBUN, OF BELOIT, ASSIGNOR TO F. W. KIMBALL, OF MILWAUKEE, WISCONSIN.

WHEELED SCRAPER.

SPECIFICATION forming part of Letters Patent No. 371,704, dated October 18, 1887.

Application filed April 25, 1887. Serial No. 236,003. (No model.)

*To all whom it may concern:*

Be it known that I, FRANK A. RATHBUN, of Beloit, in the county of Rock, in the State of Wisconsin, have invented certain new and useful Improvements in Wheeled Scrapers, of which the following is a description, reference being had to the accompanying drawings, which illustrate the preferable form of my invention.

My invention relates to that class of wheel-scrapers in which the pan or bowl is suspended from a crank-axle, and may be lowered to or raised from the ground by the partial revolution of said crank-axle for the purpose of loading the pan and carrying the load to the dumping-ground.

The object of my invention is to provide in a wheeled scraper novel mechanism whereby the pan is easily and quickly raised and lowered and held in the desired position both for loading and carrying, and also mechanism whereby the pan is dumped from the rear end thereof instead of the front end, thereby adapting my device to dump its load directly into swampy fills—a thing impossible with scrapers where the load is dumped from the front end of the pan—and also to improve wheeled scrapers in such other directions as are herein described.

To this end it consists in the construction and combination of parts illustrated in the drawings and described herein, and pointed out definitely in the claims.

In the drawings, Figure 1 is a side elevation, with one wheel removed, of my improved scraper in the loading position. Fig. 2 is the same view thereof in the carrying position. Fig. 3 is the same view thereof in the dumping position. Fig. 4 is a front elevation thereof in the loading position. Fig. 5 is a detail view of the inner side of the crank-arms.

In the drawings, A represents a crank-axle, the wrist-pins of which form the journals on which the ground-wheels B B are loosely mounted.

C C represent the pan or bowl of the scraper, which has secured to its sides the bars F F by bolts or otherwise, said bars being preferably attached to the pan somewhat in front of the center thereof, their upper ends being loosely journaled on the shaft D. Secured to the sides of the pan E by the pivot-bolts $h$ $h$ are the hounds or drag-bars H, the forward ends of which are secured to the tongue I.

J represents the seat-support, the lower end of which is bolted or otherwise rigidly secured to the tongue I. A hand-lever, L, is pivoted to some part rigid with the tongue. As shown, a casting, K, is secured to the tongue at the junction of the seat-support J and tongue I, and when secured in this position by bolts or otherwise it serves to strengthen the union between said seat-support and tongue. The lever L is pivoted to this casting K, and the spring-catch $l$ engages in the notches $k$ in the upper edge of said casting.

M represents a bar pivoted at its forward end to the lower end of the lever L. This bar extends rearward, and is provided at its end with a hook, $m$, which is adapted to pass down over and partially encircle the shaft D.

N represents a foot-lever, which is pivoted at its rear end to the bar M behind the hook $m$. From this point it extends forward, resting on the shaft D, and its free end curves upward and ends in a foot-piece, $n$.

The rear end, $e$, of the pan is pivoted to the sides thereof by the bolts $e'$, which pass through arms $e^2$, secured to the upper edge of said rear end. An upwardly-extended arm, $p$, is secured to the pivoted rear end of the pan. The upper end of this arm $p$ is pivotally connected with a link-bar, P, the forward end of which is pivoted to a downward extension, $m'$ of the bar M.

R R represent arms loosely mounted on the shaft and connected near their inner ends by a yoke, S. These arms lie close to the wheels, and their upper ends, $r$ $r$, are bent over and lie close and parallel to the rims of said wheels.

T represents an arm secured rigidly to the shaft D. Upon its upper edge is a notch, $t$, and at the rear of said upper edge is a shoulder, $t'$. This arm is of such length that the yoke S lies close above it, and a lever, V, secured rigidly to said yoke, has a spring-catch, $v$, which passes through said yoke and engages with the notch $t$ in said arm T, while the shoulder $t'$ is adapted to engage with the yoke when the same is moved backward.

Upon the sides of the pan E are the pins $e^3$, the ends of which are shown to be surrounded by the annular flanges $e^4$. Upon the inner sides of the crank-arms C are the grooves or sockets $c$, open at one end and adapted to receive the pins $e^3$. Pivoted to the inner sides of said crank-arms, and adapted to close the open ends of the grooves $c$ when the pins have entered, are the dogs or hooks $c'$, which are connected with the yoke S by short chains $c^5$.

The forcing of the nose of the pan into the ground tends to wear and bend its edge. I therefore fasten to the front lower edge of my pan, by bolts or otherwise, a removable edge. This edge may have a shoulder, $x$, against which the bottom of the pan may rest, and the bolts may be sunk into the metal, as shown, to make the bottom comparatively smooth; or the meeting surfaces of the edge and the bottom of the pan may be beveled or otherwise shaped to produce this result; or the edge may be butted against the front of the pan and fastened thereto by a strap bolted or riveted to both the pan and removable edge. When worn, this bar or edge may be replaced at slight expense.

Having now described fully the construction and arrangement of the parts which make up my improved scraper in its preferable form, I will now describe the operation of the device and point out particularly the function of each part in such operation.

As before stated, Fig. 1 represents the scraper in the loading position. It will be noticed that the pan is connected with the tongue by the drag-bars H, which connect directly with the pan below its center, and also by the bar M, which is connected indirectly, through its engagement with the shaft D, to said pan above its center. When it is desired that the pan shall dig deeper, the upper end of the lever L is drawn backward, which motion draws forward the bar M. This causes a forward and downward motion of the shaft D, and consequently the upper ends of the bars F, the result being that the pan sinks deeper into the ground, the nose or forward end of the pan being tilted downward to facilitate the operation. When the pan is loaded, the first motion of the operator should be to push forward the lever L, which raises the forward end of the pan to prevent the load from falling out. To raise the pan to the carrying position, the lever V is grasped, the spring-catch $v$ released from engagement with the arm T, which holds the arms R from dropping out of place, and the lever drawn forward. This moves the yoke S, and consequently both arms R, which revolve upon the shaft D until the ends $r$ $r$ engage with the rims of the wheels B B. The friction retains the arms R R in engagement with the wheels, and as they revolve they drag said arms with them and cause the crank-arms C and the shaft D to revolve about the wheel-axles. This lifts the pan which depends from the shaft D until it reaches the position shown in Fig. 2. During this lifting process the pan is held substantially horizontal by its double connection with the relatively stationary tongue through the instrumentality, as shown, of the hounds H H and hooked bar M, the points of connection between said instrumentalities and the pan being one above the other. In assuming this position the pins $e^3$ $e^3$ enter the sockets $c$ $c$ in the inner sides of the crank-arms C C, and the hooked dogs $c'$ automatically close over the ends of said sockets and partly surround pins and prevent the pins from leaving said sockets until the dogs are withdrawn from their engagement with said pins. The sockets $c$ are provided with grooves $c^2$ on their interior, into which the flanges $e^4$ $e^4$ on the pins enter and hold the parts firmly and prevent any side motion of the pan when in this position. A pin, $c^3$, on the free end of the dog $c'$ is adapted to engage with the rib $c^4$ on the inner side of the crank-arm C, to prevent a sudden pull on the chain $c^5$ from swinging the dog so far on its pivot as to be inoperative to act, as above described. The said pin $c^3$ also strikes against the side of the socket $c$, and thereby the dog is permitted to oscillate on its pivot only between the rib $c^4$ and the side of the socket, which renders it certain that said dog will always be in position to perform its functions. When the crank-axle has been revolved to the position shown in Fig. 2, the yoke S strikes upon the arms $e^5$, which project upward from the forward end of the pan E. This forcibly throws the arms R out of engagement with the wheels and throws back the yoke until the spring-catch $v$ engages with the notch $t$ in the arm T, as shown in Fig. 2. When the dumping-ground or "fill" has been reached, the operator first presses his foot on the foot-piece $n$ of the lever N. The lever rests on the shaft D, which acts as a fulcrum, and the pressure releases the hook $m$ from its engagement with the shaft D. This hook has served thus far to hold the pan in a substantially horizontal position; but upon its release the pan is permitted to swing backward. To initiate this movement, the operator grasps the lever V and draws it backward, which causes the crank-axle A to be revolved upon the journals of the wheels, the shaft D carrying with it the upper ends of the arms F. The pins $e^3$ being held in the socket $c$, the pan is compelled by the movement of the upper ends of the arms F to tip backward to the position shown in Fig. 3. Practically in a machine constructed as shown and described the movement of the pan is simply started by the lever V. The excess of weight upon the back of the pan and the draft through the drag-bars H below the pins $e^3$, or either of said forces, completes the dumping. As the pan tips back and its rear end swings away from the ends of the bar M, the rear end, $e$, of the pan is caused to swing upon its pivots by the connection of its arm $p$ to the bar M through the link-bar P, leaving the entire rear end open for the passage of the load. When the load has been dumped, the pan is raised to the carrying position by the operator, who draws the lever V forward, and thereby revolves the crank-axle back to its former position. The hook $m$ drops into engagement with the axle D to hold the pan horizontal. The movement of the pan also causes the rear end of the pan to close by bringing it toward the bar M. When the scraper is to be lowered to the loading position, the operator grasps the lever, releases it from the spring-catch v, and moves it backward. The first effect is to draw on the chain c⁵, which draws the dogs c' from their engagement with the pins e³ and from in front of the sockets c, and permits said pins to move out of said sockets. The next effect of the backward movement of the lever V is to cause the yoke S to strike against the shoulder t' on the arm T and force the crank-arm to revolve. It is only necessary to move the crank-axle a short distance until the crank-arms C move past the vertical position, when the weight of the pan causes the continuance of such revolution until the pan reaches the ground, in the position shown in Fig. 1, ready for loading.

The advantages of the above-described scraper are many. An especially valuable feature is that of dumping from the rear of the pan. When filling in a swampy place, the scraper may be backed to the edge of the bank and dumped right where it is wanted, whereas with scrapers which dump from the front end the load must be dumped back some distance and shoveled into the fills, or the team and scraper must be driven down into the swamp. Again, the load can be dumped in the precise place where it is wanted, whereas with scrapers that are tipped for dumping by turning down the nose to catch on the ground and be thereby turned, if the nose does not happen to catch at the point desired, the load is not dumped where it is wanted. With my scraper one man can load, dump, and bring to the carrying position without assistance, whereas with all scrapers with which I am acquainted it is necessary to keep an extra man at the fill to help to dump and another at the loading-point to assist in loading. On no other machine can one man, seated on the scraper, manage all the operations of the machine.

I do not desire to be limited to the precise form of the embodiment of my invention herein illustrated. This is in my opinion the best form; but mechanical skill will readily be able to suggest equivalents for some of the parts which will act in the same way as these herein shown and so produce the same results; nor do I wish to be limited to the use of the various parts of the scraper herein shown only with all of the other parts shown, since some of my combinations may be used while others are discarded in favor of other devices.

What I claim, and desire to secure by Letters Patent, is—

1. In a wheeled scraper, the combination of a crank-axle and a pan with suspending-bars rigidly secured to the sides of the pan, and having their upper ends journaled to the shaft of the crank-axle, a tongue or its equivalent, and double connections between the tongue and pan, the points of connection with the pan being one above the other, substantially as and for the purpose specified.

2. In a wheeled scraper, the combination of a crank-axle, bars loosely journaled on the shaft thereof, and a pan rigidly secured to the lower ends of said bars, with a tongue or its equivalent, hounds secured to the tongue and pivoted to the pan, and a bar pivotally connected with the tongue and with the upper ends of the suspending-bars, substantially as and for the purpose specified.

3. In a wheeled scraper, the combination of a crank-axle and a pan suspended therefrom with drag-bars pivoted to the pan and connected with the tongue, and a hooked bar adjustably connected with the tongue and adapted to hook over the shaft of the crank-axle, substantially as and for the purpose specified.

4. In a wheeled scraper, the combination of a crank-axle and a pan suspended therefrom with drag-bars pivoted to said pan and secured to the tongue, a hand-lever pivoted to the tongue, and a hooked bar pivoted at one end to the lower end of the lever, and having its other end adapted to hook over the shaft of the crank-axle, substantially as and for the purpose specified.

5. In a wheeled scraper, the combination of a crank-axle, a pan suspended therefrom, and means for raising said pan above the ground, with a bar pivotally connected with the tongue, having a hook on its rear end adapted to engage with the shaft of said crank-axle, and a lever pivoted to said bar behind the shaft and adapted to rest on said shaft, substantially as and for the purpose specified.

6. In a wheeled scraper, the combination of a crank-axle and a pan suspended therefrom, having pins upon its sides, with sockets on the inner sides of the crank-arms to receive said pins, and dogs for retaining said pins in the sockets, substantially as and for the purpose specified.

7. In a wheeled scraper, the combination of a crank-axle and a pan suspended therefrom, having flanged pins on its sides, with sockets in the crank-arms having interior grooves adapted to receive said flanges, substantially as and for the purpose specified.

8. In a wheeled scraper, the combination of a crank-axle and a pan suspended therefrom with pins on the sides of said pan, sockets in the crank-arms adapted to receive said pins, and dogs pivoted to said crank-arms, adapted to automatically engage with said pins to hold them in the sockets, substantially as and for the purpose specified.

9. In a wheeled scraper, the combination of a crank-axle, a pan suspended therefrom, and pins on the sides of said pan, with sockets on the inner sides of the crank-arms, dogs to hold said pins in the sockets, arms mounted on the shaft, a yoke connecting said arms, chains connecting said yoke and dogs, and a lever for moving said yoke, substantially as and for the purpose specified.

10. In a wheeled scraper, the combination of the ground-wheels, a crank-axle, and a pan suspended therefrom, with arms mounted on the shaft of said crank-axle, adapted to engage with the wheels, a yoke connecting said arms, an arm rigidly secured to the shaft of the said crank-axle, a lever secured to the yoke, and mechanism for engaging and disengaging said arm and yoke or lever, substantially as and for the purpose specified.

11. In a wheeled scraper, the combination of the ground-wheels, a crank axle, and a pan suspended therefrom with arms mounted on the shaft of the crank-axle and adapted to engage with the rim of said wheels, a yoke connecting said arms, and arms secured to said pan and adapted to strike said yoke, substantially as and for the purpose specified.

12. In a wheeled scraper, the combination of a pan having its rear end pivotally connected to the sides, and mechanism to raise the pan from the ground in a substantially horizontal position, with mechanism which automatically opens said rear end when the pan is tipped backward and closes it when it is returned to the horizontal position, substantially as and for the purpose specified.

13. In a wheeled scraper, the combination of a pan adapted to be raised above the ground, having its rear end pivotally secured to the sides, with an arm secured to said rear end, a bar pivotally connected with the tongue, a link-bar pivotally connected to said arm and bar, and means for tipping said pan backward, substantially as and for the purpose specified.

14. In a wheeled scraper, the combination of a crank-axle, a pan suspended therefrom, and means for raising and retaining said pan above the ground, with an arm rigidly secured to the shaft of the crank-axle and a lever adapted to engage with said arm, substantially as and for the purpose specified.

15. In a wheeled scraper, the combination of a crank-axle, a pan suspended therefrom, and means for raising and retaining above the ground in a substantially horizontal position, with an arm having a notch in its upper edge and a shoulder on the rear end of said upper edge, rigidly secured to the shaft of the crank-axle, and a lever with a spring-catch adapted to engage with said arm, substantially as and for the purpose specified.

16. In a scraper, the combination of a crank-arm having a socket with raised sides and the rib $c^4$ on its inner side with the dog C', pivoted to said crank-arm, and having the pin $C^3$, adapted to engage with said rib and the sides of the socket, substantially as and for the purpose specified.

FRANK A. RATHBUN.

Witnesses:
JOSEPH R. KINLEY,
E. R. NEWTON.